US008007889B2

(12) United States Patent
Abrams

(10) Patent No.: US 8,007,889 B2
(45) Date of Patent: Aug. 30, 2011

(54) FLOCKED MULTI-COLORED ADHESIVE ARTICLE WITH BRIGHT LUSTERED FLOCK AND METHODS FOR MAKING THE SAME

(75) Inventor: Louis Brown Abrams, Fort Collins, CO (US)

(73) Assignee: High Voltage Graphics, Inc., Fort Collins, CO (US)

( * ) Notice: Subject to any disclaimer, the term of this patent is extended or adjusted under 35 U.S.C. 154(b) by 290 days.

(21) Appl. No.: 11/413,797

(22) Filed: Apr. 28, 2006

(65) Prior Publication Data

US 2006/0251852 A1 Nov. 9, 2006

Related U.S. Application Data

(60) Provisional application No. 60/676,124, filed on Apr. 28, 2005, provisional application No. 60/748,505, filed on Dec. 7, 2005.

(51) Int. Cl.
*B32B 3/02* (2006.01)
*B05D 1/12* (2006.01)
*B05D 1/14* (2006.01)

(52) U.S. Cl. ................. 428/90; 428/95; 428/88; 428/97

(58) Field of Classification Search .................... 428/90, 428/95, 88, 97; 427/180, 197, 200, 202, 427/206, 462, 463
See application file for complete search history.

(56) References Cited

U.S. PATENT DOCUMENTS 1,580,717 A 4/1926 Flick
1,975,542 A 10/1934 Forsdale
1,992,676 A * 2/1935 Schwarz ....................... 428/206
2,047,978 A 7/1936 Maclaurin
2,230,654 A 2/1941 Plunkett
2,275,617 A 3/1942 Duerr et al.
2,278,227 A 3/1942 Thackeray et al.
2,477,912 A 8/1949 Vallandigham
2,592,602 A 4/1952 Saks
2,636,837 A 4/1953 Summers
2,835,576 A 5/1958 Ensink
2,981,588 A 4/1961 Hyman
2,999,763 A 9/1961 Sommer
(Continued)

FOREIGN PATENT DOCUMENTS

AU 606651 2/1991
(Continued)

OTHER PUBLICATIONS

Cellusuede Products, Inc, "Uses for Flock, Home Furnishings", Available at http://www.cellusuede.com/home.html, KMK Media Group, copyright 2000, 2 pages.
(Continued)

*Primary Examiner* — Cheryl Juska
(74) *Attorney, Agent, or Firm* — Sheridan Ross P.C.

(57) ABSTRACT

A multi-colored flocked article is provided having a plurality of flock and adhesive regions. Each flock region is defined by a plurality of flock fibers that are substantially the same in color and are substantially free of light dispersants, such as titanium dioxide. Further, each flock region is of a different color relative to an adjacent flock region to form a patterned, multi-colored design. Each of the plurality of adhesive regions corresponds to a flock region and includes a colored adhesive. The color of the adhesive is at least similar or substantially similar in color to the flock fibers in the corresponding flock region.

28 Claims, 4 Drawing Sheets

U.S. PATENT DOCUMENTS

| | | | | | |
|---|---|---|---|---|---|
| 3,099,514 | A | * | 7/1963 | Haber | 8/448 |
| 3,215,584 | A | | 11/1965 | McConnell et al. | |
| 3,314,845 | A | | 4/1967 | Perri | |
| 3,351,479 | A | | 11/1967 | Fairchild | |
| 3,377,232 | A | | 4/1968 | Mencock et al. | |
| 3,411,156 | A | | 11/1968 | Feher | |
| 3,432,446 | A | * | 3/1969 | Coppeta | 15/104.93 |
| 3,459,579 | A | | 8/1969 | Newman | |
| 3,496,054 | A | | 2/1970 | Baigas | |
| 3,529,986 | A | | 9/1970 | Kappas et al. | |
| 3,565,742 | A | | 2/1971 | Stephens et al. | |
| 3,591,401 | A | * | 7/1971 | Snyder et al. | 428/88 |
| 3,630,990 | A | | 12/1971 | Neal | |
| 3,654,232 | A | | 4/1972 | Jackson, Jr. et al. | |
| 3,660,200 | A | | 5/1972 | Anderson et al. | |
| 3,674,611 | A | | 7/1972 | Petry et al. | |
| 3,772,132 | A | | 11/1973 | Dulin, Jr. | |
| 3,793,050 | A | | 2/1974 | Mumpower, Jr. | |
| 3,803,453 | A | | 4/1974 | Hull | |
| 3,837,946 | A | | 9/1974 | Gribbin | |
| 3,887,737 | A | | 6/1975 | Baxter et al. | |
| 3,900,676 | A | | 8/1975 | Alderson | |
| 3,903,331 | A | | 9/1975 | Klein | |
| 3,917,883 | A | | 11/1975 | Jepson | |
| 3,918,895 | A | | 11/1975 | Mizuno | |
| 3,928,706 | A | | 12/1975 | Gibbons | |
| 3,936,554 | A | | 2/1976 | Squier | |
| 3,953,566 | A | | 4/1976 | Gore | |
| 3,956,552 | A | | 5/1976 | Geary | |
| 3,961,116 | A | | 6/1976 | Klein | |
| 3,969,559 | A | | 7/1976 | Boe | |
| 3,979,538 | A | | 9/1976 | Gilman et al. | |
| 3,989,869 | A | | 11/1976 | Neumaier et al. | |
| 4,018,956 | A | | 4/1977 | Casey | |
| 4,025,678 | A | | 5/1977 | Frank | |
| 4,031,281 | A | | 6/1977 | Keeling | |
| 4,034,134 | A | | 7/1977 | Gregorian et al. | |
| 4,035,532 | A | | 7/1977 | Gregorian et al. | |
| 4,062,992 | A | | 12/1977 | Power et al. | |
| 4,088,708 | A | | 5/1978 | Riew | |
| 4,104,439 | A | | 8/1978 | Fuzek | |
| 4,110,301 | A | | 8/1978 | Zannucci et al. | |
| 4,142,929 | A | | 3/1979 | Otomine et al. | |
| 4,160,851 | A | | 7/1979 | Lienert et al. | |
| 4,201,810 | A | | 5/1980 | Higashiguchi | |
| 4,218,501 | A | | 8/1980 | Kameya et al. | |
| 4,238,190 | A | | 12/1980 | Rejto | |
| 4,251,427 | A | | 2/1981 | Recker et al. | |
| 4,263,373 | A | | 4/1981 | Mccaskey et al. | |
| 4,273,817 | A | | 6/1981 | Matsuo et al. | |
| 4,282,278 | A | | 8/1981 | Higashiguchi | |
| 4,292,100 | A | | 9/1981 | Higashiguchi | |
| 4,294,577 | A | * | 10/1981 | Bernard | 8/488 |
| 4,308,296 | A | | 12/1981 | Chitouras | |
| 4,314,813 | A | | 2/1982 | Masaki | |
| 4,319,942 | A | | 3/1982 | Brenner | |
| 4,340,632 | A | | 7/1982 | Wells et al. | |
| 4,362,773 | A | | 12/1982 | Shikinami | |
| 4,385,093 | A | | 5/1983 | Hubis | |
| 4,390,387 | A | | 6/1983 | Mahn | |
| 4,396,662 | A | | 8/1983 | Higashiguchi | |
| 4,413,019 | A | | 11/1983 | Brenner | |
| 4,418,106 | A | | 11/1983 | Landler et al. | |
| 4,430,372 | A | | 2/1984 | Knoke et al. | |
| 4,438,533 | A | | 3/1984 | Hefele | |
| 4,465,723 | A | | 8/1984 | Knoke et al. | |
| 4,574,018 | A | | 3/1986 | Masuda et al. | |
| 4,588,629 | A | | 5/1986 | Taylor | |
| 4,610,904 | A | | 9/1986 | Mahn, Sr. et al. | |
| 4,652,478 | A | | 3/1987 | Maii | |
| 4,668,323 | A | | 5/1987 | Lenards et al. | |
| 4,681,791 | A | | 7/1987 | Shibahashi et al. | |
| 4,687,527 | A | | 8/1987 | Higashiguchi | |
| 4,741,791 | A | | 5/1988 | Howard et al. | |
| 4,810,549 | A | | 3/1989 | Abrams et al. | 428/88 |
| RE33,032 | E | | 8/1989 | Binsack et al. | |
| 4,861,644 | A | | 8/1989 | Young et al. | |
| 4,895,748 | A | | 1/1990 | Squires | |
| 4,923,848 | A | | 5/1990 | Akada et al. | |
| 4,931,125 | A | | 6/1990 | Volkmann et al. | |
| 4,937,115 | A | | 6/1990 | Leatherman | |
| 4,961,896 | A | | 10/1990 | Constantino | |
| 4,980,216 | A | | 12/1990 | Rompp | |
| 4,985,296 | A | | 1/1991 | Mortimer, Jr. | |
| 5,008,130 | A | | 4/1991 | Lenards | |
| 5,009,943 | A | | 4/1991 | Stahl | |
| 5,041,104 | A | | 8/1991 | Seal | |
| 5,047,103 | A | | 9/1991 | Abrams et al. | 156/72 |
| 5,059,452 | A | | 10/1991 | Squires | |
| 5,077,116 | A | | 12/1991 | Lefkowitz | |
| 5,110,670 | A | | 5/1992 | Janocha et al. | |
| 5,115,104 | A | | 5/1992 | Bunyan | |
| 5,126,182 | A | * | 6/1992 | Lumb et al. | 428/90 |
| 5,155,163 | A | | 10/1992 | Abeywardena et al. | |
| 5,196,262 | A | | 3/1993 | Schwarz et al. | |
| 5,198,277 | A | | 3/1993 | Hamilton et al. | |
| 5,207,851 | A | | 5/1993 | Abrams | 156/230 |
| 5,219,941 | A | | 6/1993 | Meyer, Jr. et al. | |
| 5,298,031 | A | | 3/1994 | Gabay et al. | |
| 5,312,576 | A | | 5/1994 | Swei et al. | |
| 5,338,603 | A | | 8/1994 | Mahn et al. | |
| 5,346,746 | A | | 9/1994 | Abrams | 428/195.1 |
| 5,348,699 | A | | 9/1994 | Meyer et al. | |
| 5,383,996 | A | | 1/1995 | Dressler | |
| 5,385,694 | A | | 1/1995 | Wu et al. | |
| 5,403,884 | A | | 4/1995 | Perlinski | |
| 5,411,783 | A | | 5/1995 | Mahn, Jr. | |
| 5,413,841 | A | | 5/1995 | Mahn et al. | |
| 5,480,506 | A | | 1/1996 | Mahn, Sr. et al. | |
| 5,529,650 | A | | 6/1996 | Bowers et al. | |
| 5,534,099 | A | | 7/1996 | Yamamoto | |
| 5,543,195 | A | * | 8/1996 | Squires et al. | 428/90 |
| 5,597,633 | A | | 1/1997 | Mecke et al. | |
| 5,597,637 | A | | 1/1997 | Abrams et al. | 428/90 |
| 5,665,458 | A | | 9/1997 | Mahn, Jr. | |
| 5,681,420 | A | | 10/1997 | Yamane | |
| 5,685,223 | A | * | 11/1997 | Vermuelen et al. | 101/129 |
| 5,693,400 | A | | 12/1997 | Hamilton et al. | |
| 5,756,180 | A | * | 5/1998 | Squires et al. | 428/90 |
| 5,766,397 | A | | 6/1998 | Jones | |
| 5,771,796 | A | | 6/1998 | Morrison et al. | |
| 5,804,007 | A | | 9/1998 | Asano | |
| 5,851,617 | A | | 12/1998 | Keiser | |
| 5,858,156 | A | | 1/1999 | Abrams et al. | 156/230 |
| 5,863,633 | A | * | 1/1999 | Squires et al. | 428/90 |
| 5,866,248 | A | | 2/1999 | Dressler | |
| 5,914,176 | A | | 6/1999 | Myers | |
| 5,981,021 | A | | 11/1999 | McCulloch | |
| 6,010,764 | A | | 1/2000 | Abrams | 428/90 |
| 6,025,068 | A | | 2/2000 | Pekala | |
| 6,083,332 | A | | 7/2000 | Abrams | 156/72 |
| 6,110,560 | A | | 8/2000 | Abrams | 428/90 |
| 6,114,023 | A | | 9/2000 | Schwarz et al. | |
| 6,152,038 | A | | 11/2000 | Wagner et al. | |
| 6,178,680 | B1 | | 1/2001 | Sloot | |
| 6,224,707 | B1 | | 5/2001 | Lion | |
| 6,247,215 | B1 | | 6/2001 | Van Alboom et al. | |
| 6,249,297 | B1 | * | 6/2001 | Lion | 347/171 |
| 6,264,775 | B1 | | 7/2001 | Holeschovsky et al. | |
| 6,299,715 | B1 | | 10/2001 | Langsdorf et al. | |
| 6,350,504 | B1 | | 2/2002 | Alboom et al. | |
| 6,361,855 | B2 | | 3/2002 | Mahn, Jr. et al. | |
| 6,376,041 | B1 | | 4/2002 | Morrison et al. | |
| 6,436,506 | B1 | | 8/2002 | Pinter et al. | |
| 6,555,648 | B1 | | 4/2003 | Hinds | |
| 6,648,926 | B1 | | 11/2003 | Immediato | |
| 6,676,796 | B2 | | 1/2004 | Pinter et al. | |
| 6,774,067 | B2 | | 8/2004 | Demott et al. | |
| 6,818,293 | B1 | | 11/2004 | Keep et al. | |
| 6,836,915 | B2 | | 1/2005 | Song et al. | |
| 6,913,714 | B2 | | 7/2005 | Liu et al. | |
| 6,924,000 | B2 | | 8/2005 | Tallmadge | |
| 6,929,771 | B1 | | 8/2005 | Abrams | 269/511 |
| 6,972,305 | B1 | | 12/2005 | Griessmann et al. | |
| 6,977,023 | B2 | | 12/2005 | Abrams | 156/230 |
| 7,135,518 | B2 | | 11/2006 | Bandou et al. | |
| 7,229,680 | B1 | | 6/2007 | Crompton | |

| | | | | |
|---|---|---|---|---|
| 7,344,769 | B1 | 3/2008 | Abrams | |
| 7,393,516 | B2 | 7/2008 | Seo et al. | |
| 7,393,576 | B2 * | 7/2008 | Abrams | 428/90 |
| 7,410,932 | B2 | 8/2008 | Figueroa | |
| 7,461,444 | B2 | 12/2008 | Deaett et al. | |
| 2001/0008039 | A1 | 7/2001 | Alboom et al. | |
| 2001/0008672 | A1 | 7/2001 | Norvell et al. | |
| 2002/0009571 | A1 | 1/2002 | Abrams | 428/85 |
| 2002/0098329 | A1 | 7/2002 | Abrams | |
| 2003/0072889 | A1 | 4/2003 | Abrams | |
| 2003/0129353 | A1 | 7/2003 | Abrams | |
| 2003/0186019 | A1 | 10/2003 | Abrams | |
| 2003/0203152 | A1 | 10/2003 | Higgins et al. | |
| 2003/0207072 | A1 | 11/2003 | Abrams | 428/90 |
| 2003/0211279 | A1 | 11/2003 | Abrams | 156/230 |
| 2004/0010093 | A1 | 1/2004 | Wefringhaus et al. | |
| 2004/0033334 | A1 | 2/2004 | Merovitz | |
| 2004/0050482 | A1 | 3/2004 | Abrams | 428/85 |
| 2004/0053001 | A1 | 3/2004 | Abrams | 428/90 |
| 2004/0055692 | A1 | 3/2004 | Abrams | 428/95 |
| 2004/0058120 | A1 | 3/2004 | Abrams | 428/85 |
| 2004/0081791 | A1 | 4/2004 | Abrams | 428/85 |
| 2004/0170799 | A1 | 9/2004 | Carr et al. | |
| 2004/0214493 | A1 | 10/2004 | Smith | |
| 2004/0214495 | A1 | 10/2004 | Foss et al. | |
| 2005/0081985 | A1 | 4/2005 | Abrams | 156/230 |
| 2005/0158508 | A1 | 7/2005 | Abrams | 428/90 |
| 2005/0188447 | A1 | 9/2005 | Gray | |
| 2005/0260378 | A1 | 11/2005 | Bernabeu | |
| 2005/0266204 | A1 | 12/2005 | Abrams | 428/85 |
| 2005/0268407 | A1 | 12/2005 | Abrams | 8/539 |
| 2006/0026778 | A1 | 2/2006 | Lion | |
| 2006/0029767 | A1 | 2/2006 | Lion | |
| 2006/0142405 | A1 | 6/2006 | Kijima | |
| 2006/0150300 | A1 | 7/2006 | Hassan et al. | |
| 2006/0160943 | A1 | 7/2006 | Weir | |
| 2006/0251852 | A1 | 11/2006 | Abrams | |
| 2006/0257618 | A1 * | 11/2006 | Pascual Bernabeu | 428/90 |
| 2007/0003761 | A1 | 1/2007 | Miyazono et al. | |
| 2007/0022548 | A1 | 2/2007 | Abrams | |
| 2007/0026189 | A1 | 2/2007 | Abrams | |
| 2007/0102093 | A1 | 5/2007 | Abrams | |
| 2007/0110949 | A1 | 5/2007 | Abrams | |
| 2007/0148397 | A1 | 6/2007 | Abrams | |
| 2007/0219073 | A1 | 9/2007 | Mannschedel | |
| 2007/0289688 | A1 | 12/2007 | Abrams | |
| 2008/0003394 | A1 | 1/2008 | Eke | |
| 2008/0003399 | A1 | 1/2008 | Abrams | |
| 2008/0006968 | A1 | 1/2008 | Abrams | |
| 2008/0050548 | A1 | 2/2008 | Abrams | |
| 2008/0095973 | A1 | 4/2008 | Abrams | |
| 2008/0102239 | A1 | 5/2008 | Abrams | |
| 2008/0111047 | A1 | 5/2008 | Abrams | |
| 2008/0113144 | A1 | 5/2008 | Abrams | |
| 2008/0124503 | A1 | 5/2008 | Abrams | |
| 2008/0145585 | A1 | 6/2008 | Abrams | |
| 2008/0150186 | A1 | 6/2008 | Abrams | |
| 2008/0187706 | A1 | 8/2008 | Lion et al. | |
| 2009/0280290 | A1 | 11/2009 | Weedlun | |
| 2010/0178445 | A1 | 7/2010 | Shen et al. | |

FOREIGN PATENT DOCUMENTS

| | | | | |
|---|---|---|---|---|
| AU | 653994 | | | 10/1994 |
| BE | 0506601 | | | 3/1996 |
| CA | 757595 | | | 4/1967 |
| CA | 2010076 | | | 8/1990 |
| CA | 1306411 | | | 8/1992 |
| CA | 2064300 | | | 9/1992 |
| DE | 3883517 | | | 5/1994 |
| DE | 69208910 | | | 8/1996 |
| DE | 19707381 | | | 8/1998 |
| DE | 19734316 | | | 2/1999 |
| EP | 0122656 | | | 10/1984 |
| EP | 122656 | A1 | * | 10/1984 |
| EP | 0210304 | | | 2/1987 |
| EP | 0280296 | | | 8/1988 |
| EP | E 93 557 | | | 8/1988 |
| EP | 0351079 | | | 1/1990 |
| EP | 0506601 | | | 9/1992 |
| EP | 0685014 | | | 12/1995 |
| EP | 0506601 | | | 5/1996 |
| EP | E 135 427 | | | 8/1996 |
| EP | 0913271 | | | 10/1998 |
| EP | 0989227 | | | 3/2000 |
| EP | 1072712 | | | 1/2001 |
| EP | 1598463 | A1 | * | 11/2005 |
| FR | 2442721 | | | 8/1980 |
| FR | 2543984 | | | 10/1984 |
| FR | 2659094 | | | 9/1991 |
| FR | 2784619 | | | 4/2000 |
| FR | 2846202 | | | 4/2004 |
| FR | 2881149 | | | 7/2006 |
| GB | 1171296 | | | 11/1969 |
| GB | 1466271 | | | 3/1977 |
| GB | 2065031 | | | 6/1981 |
| GB | 2101932 | A | * | 1/1983 |
| GB | 2126951 | | | 4/1984 |
| GB | 2214869 | | | 9/1989 |
| GB | 2 227 715 | A | | 8/1990 |
| GB | 0506601 | | | 9/1992 |
| IE | 55104 | | | 10/1984 |
| IT | 0329767 | | | 8/1993 |
| IT | 24637BE/96 | | | 6/1996 |
| JP | 71007184 | | | 6/1965 |
| JP | 55079143 | | | 6/1980 |
| JP | 55-147171 | | | 11/1980 |
| JP | 56058824 | | | 5/1981 |
| JP | 56107080 | | | 8/1981 |
| JP | 56108565 | | | 8/1981 |
| JP | 56141877 | | | 11/1981 |
| JP | 58062027 | | | 4/1983 |
| JP | 59115885 | | | 7/1984 |
| JP | S61-146368 | | | 7/1986 |
| JP | 62-033576 | | | 2/1987 |
| JP | 62-144911 | | | 6/1987 |
| JP | 63118544 | | | 5/1988 |
| JP | 64-014021 | | | 1/1989 |
| JP | 64-61299 | | | 3/1989 |
| JP | 01068582 | A | * | 3/1989 |
| JP | 01192538 | A | * | 8/1989 |
| JP | 01-266284 | | | 10/1989 |
| JP | 01-310947 | | | 12/1989 |
| JP | 02048076 | A | * | 2/1990 |
| JP | 04-126221 | | | 4/1992 |
| JP | 04-169297 | | | 6/1992 |
| JP | 5-201196 | | | 8/1993 |
| JP | 06-171048 | | | 6/1994 |
| JP | 08-267625 | | | 10/1996 |
| JP | 10059790 | | | 3/1998 |
| JP | 10-202691 | | | 8/1998 |
| JP | 11-042749 | | | 2/1999 |
| JP | 11256484 | A | * | 9/1999 |
| JP | 11348159 | | | 12/1999 |
| JP | 3076851 | | | 8/2000 |
| JP | 2000263673 | A | * | 9/2000 |
| JP | 2001-226885 | | | 8/2001 |
| JP | 2001270019 | | | 10/2001 |
| KR | 220373 | | | 9/1999 |
| KR | 2003063833 | | | 7/2003 |
| NO | 306099 | | | 6/1989 |
| TW | 62640 | | | 7/1993 |
| WO | WO 89/01829 | | | 3/1989 |
| WO | WO 90/09289 | | | 8/1990 |
| WO | WO 92/04502 | | | 3/1992 |
| WO | WO 93/12283 | | | 6/1993 |
| WO | WO 94/19530 | | | 9/1994 |
| WO | WO 97/34507 | | | 9/1997 |
| WO | WO 02/07959 | | | 1/2002 |
| WO | WO 02/09925 | | | 2/2002 |
| WO | WO 02/058854 | | | 8/2002 |
| WO | WO 03/031083 | | | 4/2003 |
| WO | WO 2004/005023 | | | 1/2004 |
| WO | WO 2004/005413 | | | 1/2004 |
| WO | WO 2004/005600 | | | 1/2004 |
| WO | WO 2005/035235 | | | 4/2005 |
| WO | WO 2005/118948 | | | 12/2005 |
| ZA | 88/6259 | | | 4/1990 |
| ZA | 92/2154 | | | 2/1993 |

OTHER PUBLICATIONS

Cellusuede Products, Inc, "About Flock", Available at http://www.cellusuede.com/navabout.html, KMK Media Group, copyright 2000, 1 pages.
Cellusuede Products, Inc, "Fiber Types", Available at http://www.cellusuede.com/about/types.html, KMK Media Group, copyright 2000, 4 pages.
Cellusuede Products, Inc, "Glossary of Terms", Available at http://www.cellusuede.com/glossary/index.html, KMK Media Group, copyright 2000, 2 pages.
Cellusuede Products, Inc, "FAQ's", Available at http://www.cellusuede.com/faq.html, KMK Media Group, copyright 2000, 2 pages.
U.S. Appl. No. 29/058,551, Abrams.
U.S. Appl. No. 09/548,839, Abrams.
"Aeroshoes the microporous membrane for absorption and desorption"; AeroShoes; available at http://www.aeroshoes.com/flashon/product/default.htm; 1 page; undated.
"Celgard Announces New Products and New Customer"; May 2, 2005; 1 page.
"Flockin' to Precision"; Images Magazine; Feb. 1992, 1 page.
"Product Information" Celgard Inc.; available at http:/www.celgard.com/products/product-information.cfm; 1 page; undated.
"Engineering of Wool Carpet Yarns: Yarn Bonding Technology," Wools of New Zealand (2002), available at http://www.canesis.com/Documents/Yarn_bonding_technology.pdf, pp. 1-13.
"Fabric Processing Guidelines and Expected Product Attributes," Wellman, Inc., The Fibers Division (Jul. 25, 2001), 8 pages.
Bostik USA; "Automotive & Industrial Division: Web & Powder Adhesives" (2002), available at http://www.bostik.com/oem/web_adhesives.html, 2 pages.
Bostik USA; "Industrial Adhesives" (2001), 3 pages.
Bostik USA; Web & Powder Adhesives; 2000; 2 pgs.
Bostik, "Technical Data Sheet PE103 Web Adhesives", revised Feb. 7, 2006, 5 pages.
Brown Abrams, "Flocking A Touch of Velour" ScreenPrinting (Apr. 1987).
Brown Abrams, "Part II: Flocking" ScreenPrinting (Jun. 1987).
Stahls', New Product Bulletin; 7 pages.
Studt et al.; "Versatality on a roll: Thermoplastic adhesive films"; Collano; Oct. 2002; 8 pages.
Website entitled "Frequently Asked Questions (FAQ's)," A1 Custom Mousepad Imaging Inc. (2003), available at http://www.a1imaging.com/faqs.html, 2 pages.
Declaration of L. Brown Abrams Under 37 CFR § 1.98 for U.S. Appl. No. 09/735,721 dated Jan. 16, 2004, 2 pages.
Declaration of L. Brown Abrams under 37 CFR § 1.98 for U.S. Appl. No. 09/621,830 dated Jan. 7, 2003, 2 pages.
Declaration of L. Brown Abrams under 37 CFR § 1.98 for U.S. Appl. No. 10/394,357 dated Jan. 16, 2004, 4 pages with Appendix A-I.
Declaration of L. Brown Abrams under 37 CFR 1.132 for U.S. Appl. No. 09/735,721dated Jan. 7, 2003.
Declaration of L. Brown Abrams under 37 CFR § 1.98 for U.S. Appl. No. 09/621,830 dated Jan. 16, 2004, 2 pages.
Declaration of L. Brown Abrams under 37 CFR § 1.98 for U.S. Appl. No. 10/394,357 dated Jan. 3, 2007, 4 pages with Appendix A-I.
Second Supplemental Declaration of L. Brown Abrams under 37 CFR §1.132 for U.S. Appl. No. 09/548,839 executed Jan. 7, 2003.
Supplemental Declaration of L. Brown Abrams under 37 CFR § 1.132 for U.S. Appl. No. 09/548,839 executed Oct. 23, 2002.
"Bicomponent Fibers", available at http://web.utk.edu/~mse/pages/Textiles/Bicomponent%20fibers.htm, Updated Apr. 2004, 8 pages.
U.S. Appl. No. 11/972,440, filed Jan. 10, 2008, Abrams.
U.S. Appl. No. 12/031,445, filed Feb. 14, 2008, Abrams.
"Polymers", Chemistry, Unit 16, date unknonwn, pp. 313-325.
International Search Report for International (PCT) Patent Application No. PCT/US06/16307, mailed Aug. 24, 2007.
Written Opinion for International (PCT) Patent Application No. PCT/US06/16307, mailed Aug. 24, 2007.
International Preliminary Report on Patentability for International (PCT) Patent Application No. PCT/US06/16307, mailed Nov. 8, 2007.
Bright, Larry. "Trouble Shooting Continuous Thermosol Dyeing of Polyester Fiber and Blends". American Dyestuff Reporter, Aug. 1996, pp. 60-61.
U.S. Appl. No. 12/758,633, filed Apr. 12, 2010, Abrams.
U.S. Appl. No. 12/787,938, filed May 26, 2010, Abrams.
Declaration of L. Brown Abrams Under 37 CFR 1.98 Executed Nov. 22, 2003 for U.S. Appl. No. 10/614,340 filed Jul. 3, 2003.
"Eckart - Excellence in effect pigments"; Eckart GmbH & Co. KG; available at http://www.eckartamerica.com/page.asp?NavigationID=15&MainNavigationID=3&PageID=16; printed Aug. 21, 2006; 2 pages.
"Eckart Inks"; Eckart GmbH & Co. KG; available at http://www.deltatecnic.com/eckinken.htm; printed Aug. 21, 2006; 2 pages.
"Metallic pigment dispersions, pellets and powders for Inks"; Eckart, undated, 28 pages.
Lextra® MouseRug®; "About the Product" (Jan. 27, 1999), http://www.mouserug.com/mouserug/aboutmouserugs.html, 2 pages.
Lextra® MouseRug®; "Dimensions" (Jan. 27, 1999), http://www.mouserug.com/mouserug/dimensions.html, 1 page.
Lextra® MouseRug®; "MouseRug Components" (Jan. 27, 1999), http://www.mouserug.com/mouserug/mousecomp.html, 1 page.
Orlych, "Silicone-Adhesive Interactions"; ASI Adhesives & Sealants Industry; May 2004; 9 pages.
Restriction Requirement for U.S. Appl. No. 11/565,974, mailed Dec. 18, 2009.
Restriction Requirement for U.S. Appl. No. 11/842,387, mailed Dec. 18, 2009.
Official Action for U.S. Appl. No. 11/565,974, mailed Dec. 11, 2008.
Official Action for U.S. Appl. No. 11/565,974, mailed Jul. 10, 2009.
Official Action for U.S. Appl. No. 11/842,387, mailed Dec. 12, 2008.
Official Action for U.S. Appl. No. 11/842,387, mailed Jul. 13, 2009.
Official Action for U.S. Appl. No. 11/565,974, mailed Jun. 23, 2010.
Official Action for U.S. Appl. No. 11/842,387, mailed Jul. 21, 2010.
Restriction Requirement for U.S. Appl. No. 12/787,938, mailed Mar. 15, 2011.
Official Action for U.S. Appl. No. 12/787,938, mailed Jun. 7, 2011.

* cited by examiner

FLOCKED MULTI-COLORED ADHESIVE ARTICLE WITH BRIGHT LUSTERED FLOCK AND METHODS FOR MAKING THE SAME

CROSS REFERENCE TO RELATED APPLICATION

The present application claims the benefits of U.S. Provisional Application Ser. Nos. 60/676,124, filed Apr. 28, 2005, entitled "Lextra Brite Decorative Articles," and 60/748,505, filed Dec. 7, 2005, entitled "Flocked Multi-Colored Adhesive Article with Bright Lustered Flock," each of which is incorporated herein by this reference.

FIELD OF THE INVENTION

The invention relates generally to flocked articles and particularly to flocked multi-colored adhesive articles with bright lustered flock, and to methods of making the same.

BACKGROUND OF THE INVENTION

Flocked articles are used in a wide variety of applications. For example, flocked articles are used as patches, transfers, molded objects, and the like. Generally, flocked articles are less expensive than embroidered articles to manufacture and the flock provides a "plusher" feel to the article relative to embroidered articles.

Even with flocked articles, there are varying degrees of plushness. Plushness refers to the resilience, tactile sensation, or dimension of the fiber coating and is generally a combination of one or more of the following characteristics: fiber type (e.g., durometer, softness or hardness of the plastic, resilience of the fiber itself); fiber diameter (e.g., denier or decitex); fiber density (e.g., grams per square meter); fiber cut length (e.g., mm or thousandths of an inch); evenness of the cut (unevenly cut fibers, flocked together, actually can feel softer than uniformly cut fibers); depth into the adhesive to which the fibers are planted or situated; angle of fibers in the adhesive (with a normal orientation being most desirable); uniformity of angle of fibers in the adhesive (whether most of the fibers are oriented in the same direction or in diverse directions); softness of the adhesive base resin (e.g., a base resin that has been foamed with air is generally softer); and evenness of adhesive coating (e.g., thicker or thinner in areas). Plushness is sometimes further characterized by the flock's resistance or lack of resistance to touch or to a force, the fiber's resistance to bending and yielding, and also to the fiber's slipping characteristics (e.g., the longitudinal movement along a fiber with lack of resistance—easy slipping, for example, can make a soft fiber feel "wet"). More plush flocked articles generally have a higher perceived value to buyers.

As important as the plushness of a flocked article may be, it is equally desirable for the flock to have an attractive appearance. Conventional multicolor plush direct-flocked heat transfers are typically made using multicolor "full dull" or "grand mat" type fibers, which by definition include at least about 1 wt % light dispersants, such as titanium dioxide. As will be appreciated, light dispersants are normally used to diffuse the light to eliminate unsightly and uneven shading, mottling, or shadows from light passing through the fibers. Multicolor flock products normally use a white adhesive backing that tends to reflect light, accentuate uneven characteristics, and show through the fibers somewhat or influence them with light reflecting off the adhesive and passing back through the fibers. A medium blue bright fiber, for example, would appear lighter and, as one's viewing angle shifted, one could see evidence of shading and/or pigment colors blocking the light viewed through the different fiber densities. The shading represents generally a variation in the amount of light reflected and passing back through the fiber. As a result, the fibers appear to have a dull finish and do not reflect light in contrast to the bright, light-reflective sheen that is typically seen on embroidery threads and which is associated with a high quality decoration, i.e. similar to the difference between frosted or matt glass and clear glass.

In addition to these drawbacks, the adhesives of conventional flocked articles are typically colored differently than the flock fibers themselves (with most adhesives being white as described above) and thus do not enhance or amplify the fiber color and are visually unappealing. Therefore, the off-colored adhesive must be overcome by the flock fiber colors. To adequately conceal the adhesive color, manufacturers have used relatively high flock densities, which have increased operating costs and impacted detrimentally the "feel" of the flocked surface. However, even with higher flock densities, the wear resistance of such flocked articles can be limited. As flock fibers are dislodged during use, the adhesive will be revealed, destroying the visual appeal of the article.

Manufacturers have attempted to use matching color latex adhesive behind a single color image (e.g., black latex or gold latex behind black flock or gold flock) to enhance the color of the flocked article and address the aesthetic problems associated with using an off-color adhesive. Color matching of the backing adhesive and flock fibers has had limited efficacy, however, because the use of "full dull" flock fibers still fails to provide a highly desirable brilliance or sheen to the fibers.

There is thus a need to provide a flocked article having a brilliant sheen and appearance, a high degree of plushness and wear resistance, while using a lower flock density compared to existing articles to enhance the soft touch without detracting from the appearance.

SUMMARY OF THE INVENTION

These and other needs are addressed by the various embodiments and configurations of the present invention.

In one embodiment of the present invention, bright or semi-bright lustered flock and underlying and matching colored adhesives are used together to realize various visual effects in the flocked product. The colors of the flock are typically at least similar in color to the underlying adhesive.

The present invention has found that brilliant or bright luster flock fibers, containing little or no light dispersants, such as white pigments, can provide decorative articles of a unique and surprisingly rich, lustrous, and attractive appearance. In addition, color matching adhesive and flock can dramatically reduce the shading effect because the same or a similar color is reflected and transmitted back through the fibers to even out the color perception. For example, while red flock fibers may show shading with a bright white backing latex adhesive because of the color contrast, red flock fibers with a matching, underlying red color adhesive will generally have little, if any, internal color contrast. Moreover, to realize a desired appearance, color matching can permit the use of a lower flock density when compared to color mismatching with a white adhesive.

In a second embodiment, a multi-colored flocked article having a plurality of flock regions and a plurality of adhesive regions is provided. Each of the plurality of flock regions is defined by a plurality of flock fibers that are substantially the same in color and are substantially free of light dispersants. Preferably, the flock fibers include less than about 1 wt % light dispersants, more preferably less than about 0.5 wt % light dispersants, and even more preferably less than about 0.05 wt % light dispersants. In one embodiment, the light dispersants are titanium dioxide. The flock fibers of each flock region collectively define a single color that is preferably different from the color of an adjacent flock region to form a patterned, multi-colored design.

Further, each of the plurality of adhesive regions typically correspond to a similarly colored flock region. The phrases "at least similar" or "substantially similar" mean that the adhesive regions and corresponding flock regions have identical, substantially similar, or similar colors. In one configuration, the colored adhesives are latex adhesives and the plurality of adhesive regions are in registration with a corresponding like-colored flock region. For example, the regions may be different shades of the same color, or slightly different colors that are adjacent to one another on the color wheel.

In another embodiment, the flocked article further includes a backing adhesive and the plurality of colored adhesive regions are positioned between the flock regions and the backing adhesive.

In another embodiment, a first adhesive layer that is at least one of substantially transparent and translucent engages the flock fibers on a first surface of the first adhesive layer and colored backing regions on an opposing second surface of the first adhesive layer. The colored backing regions can further contact a second adhesive layer. Because the second adhesive layer is disposed between the flock fibers and the colored backing materials, the first and second colored backing materials do not normally contact ends of the flock fibers in the first and second flock fiber sets, respectively. A substantially transparent adhesive layer may be positioned between the flock and the colored adhesive layer to provide a "frosted" effect and adhere the flock to the colored adhesive layer.

In one configuration, each backing region includes a colored ink. The color of the ink is at least similar to the flock fibers in the corresponding flock region.

In accordance with another embodiment, at least some of the flock fibers have a non-cylindrical shape, such as a trilobal shape, that directs a substantial amount of light to the fiber surface, provides additional surfaces from which light can reflect for maximum brilliance, and diffuses only a relatively small amount of light.

In yet another embodiment, at least a portion of the colored adhesives includes a solidifying agent. The solidifying agent enables the adhesive to solidify, in whole or part, before the next colored adhesive is applied in the manufacturing process as will be described below. In one embodiment, the solidifying agent is a metal salt, an alginate compound, and/or a reaction product from a reaction between the solidifying agent and the alginate compound.

When the solidifying agent is a reaction product between the solidifying agent and the alginate compound, the agent causes a skin layer to form over the backing regions. The skin layer provides a protective coating for the colored adhesive or ink, for example, to enable a second colored adhesive or ink to be printed adjacent to the first colored adhesive or ink without running into, mixing, or other blending into the second adhesive or ink while the first adhesives or ink is still wet without sticking to the bottom of subsequent screens. Adhesives or inks stuck to the bottom of the screens may interfere with screen printing by throwing screens out of level or alignment needed for controlled printing.

Alternatively, a flash-dry mechanism could be used in combination with fast-dry inks or adhesives to solidify the first adhesive or ink prior to application of the second ink or adhesive. Further alternatively, any suitable UV-curable ink or adhesive may be used in combination with UV energy to solidify the first adhesive or ink prior to application of the second ink or adhesive.

Flock fibers can be applied by a number of techniques. For example, the fibers be applied to the colored backing material as part of a transfer or directly flocked onto the backing material.

The use of bright luster fibers with matching color adhesive backing can offer at least the following advantages: a highly rich color intensity, and a shiny fiber coating that is similar to high-perceived-value embroidery. It can also provide a product that can be embossed, which re-orients the fibers to show even more of a "side view," and therefore the sheen of the bright fiber not normally seen from a cut-ends view. The use of underlying multi-colored adhesives that are color matched to bright-lustered flock fibers when compared to conventional flocked articles using dull lustered flock fibers and an off-color adhesive, or a differently colored, backing adhesive, can permit the use of a lower flock density and longer flock fibers while still providing a plush "feel" to the flock fiber layer.

Other advantages will be apparent to one of ordinary skill in the art from the disclosure provided below.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The above-described embodiments and configurations are neither complete nor exhaustive. As will be appreciated, other embodiments of the invention are possible utilizing, alone or in combination, one or more of the features set forth above or described in detail below.

DETAILED DESCRIPTION

Figure 1:
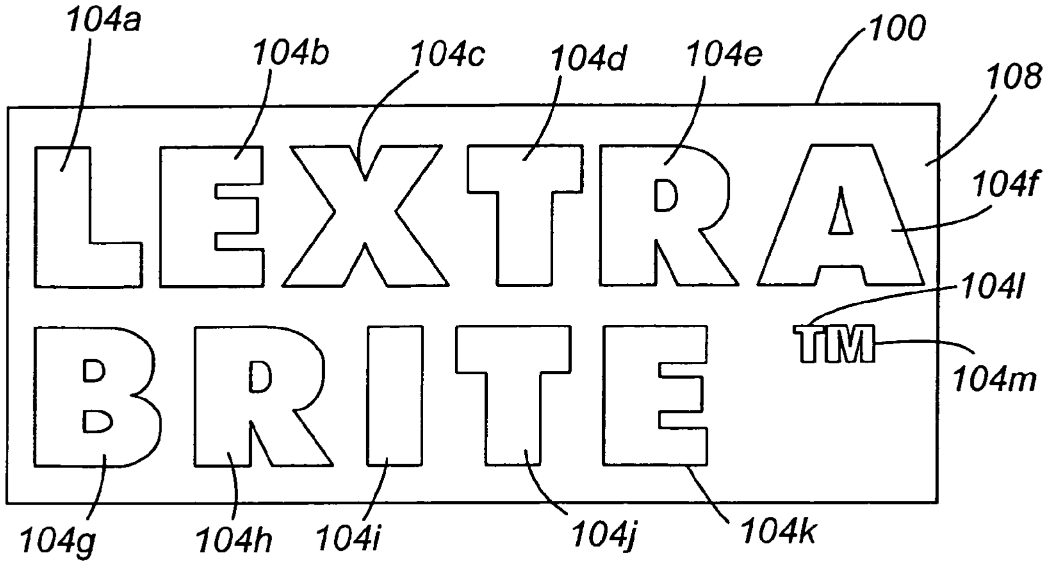
FIG. 1 is a plan view of a flocked article according to an embodiment of the present invention.

FIG. 1 shows a flocked article 100 according to an embodiment of the present invention. The flocked article 100 comprises two different colored regions, namely lettered areas 104*a-m* having a color and a background region 108 having a color. The lettered areas 104*a-m* includes a plurality of flock fibers and the background region 108 includes colored inks or colored adhesives, such as colored latex adhesives. The flock in the lettered areas 104*a*, for example, has a color that is at least similar to the color of the background region 108 underlying the flock. In this way, the adhesive will "blend in" with, and visually highlight the flock. When reflected light is not diffused, it will appear more intense.

The flocked article 100 uses flock fibers having a bright luster and having little, if any, dulling light dispersants, such as a white pigment (i.e. titanium dioxide) to enable a substantial amount of light to travel through the fiber. As used herein, the term "luster" refers to the degree of reflectance and scattering of light on the surface of the fiber. The light scattering ability of a flock fiber is directly dependent on the amount of light dispersants in the flock fiber. Fibers with higher amounts of light dispersants, for example, will scatter more light than those with lower amounts of light dispersants. Preferably, the flock fibers of the present invention have, at most, only a small amount of the light dispersants, and thus have a low light scattering ability, and a relatively brilliant appearance. In one embodiment, the flock fibers have no more than about 1 wt % light dispersants, preferably no more than about 0.5 wt % light dispersants, and even more preferably, less than about 0.05 wt % light dispersants. In a particular embodiment, the light dispersant is titanium dioxide.

Figure 2:
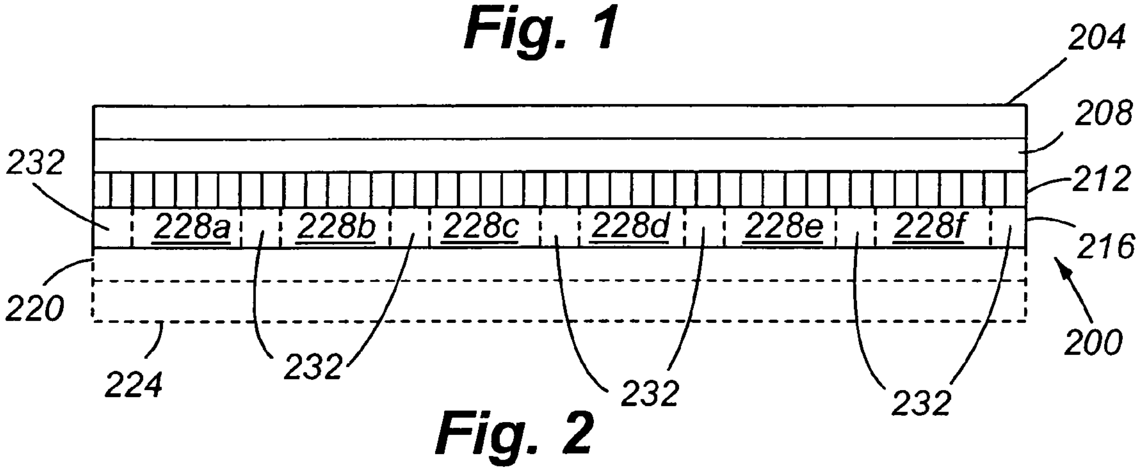
FIG. 2 is a side view of a flocked transfer according to an embodiment of the present invention.

FIG. 2 shows a flocked article 200 according to another embodiment of the present invention. The article 200 includes a carrier sheet 204, release adhesive layer 208, flock layer 212, and first, second, and third adhesive layers 216, 220, and 224 (with the second and third adhesive layers 220 and 224 being optional). As can be seen from FIG. 2, the flock fibers in the flock layer 212 are substantially perpendicular to the planes of the carrier sheet 204 and adhesive layers 216, 220, and 224 to provide a plush feel.

The carrier sheet 204 can be any desirable sacrificial carrier, such as cellulose (paper), microporous substrate (such as described in U.S. Pat. No. 6,025,068, U.S. patent application Ser. No. 09/621,830; and copending U.S. Provisional Application Ser. Nos. 60/628,836, filed Nov. 16, 2005; 60/676,124, filed Apr. 28, 2005; 60/703,925, filed Jul. 28, 2005; 60/704,681, filed Aug. 1, 2005; 60/707,577, filed Aug. 11, 2005; 60/710,368, filed Aug. 22, 2005; 60/716,869, filed Sep. 13, 2005; 60/719,469, filed Sep. 21, 2005; and 60/719,098, filed Sep. 20, 2005, to Abrams, each of which is incorporated herein by this reference), and other known carriers. The release adhesive 208 can be any suitable adhesive, such as those disclosed in any of the above copending U.S. applications.

The flock 212 used in any of the processes discussed herein may be any electrostatically chargeable fiber, such as fibers made from rayon, nylon, cotton, acrylic, and polyester, with rayon and nylon being preferred. The flock fibers 212 preferably have a bright luster as opposed to a dull or semi-dull luster. Thus, the fibers 212 preferably have no more than about 0.1 wt. % light dispersants, and more preferably no more than about 0.05 wt. % light dispersants. In one embodiment, the white pigment is titanium dioxide. The absence of the light dispersants, such as white pigment, further eliminates unsightly shading or shadows caused by light passing through the fibers.

The first adhesive layer 216 may comprise any type of colored adhesive, such as water-based or solvent-based epoxies, phenoformaldehyde, polyvinyl butyral, cyanoacrylates, polyethylenes, isobutylenes, polyamides, polyvinyl acetate, latexes, acrylics, and polyesters, and can exhibit thermoplastic and/or thermoset behavior. In one embodiment, the first adhesive layer includes a UV-curable adhesive that can be solidified by irradiation with UV light. In another embodiment, the first adhesive layer 216 includes a latex adhesive. In yet another embodiment, the first adhesive layer 216 includes a plastisol adhesive. As will be appreciated, "plastisol" is a dispersion of finely divided resin in plasticizer that forms a paste that solidifies when heated above a set temperature as a result of solvation of the resin particles by the plasticizer.

As can be seen from FIG. 2, the first adhesive layer 216 has a plurality of differently colored areas that are in registration, with the flock fibers. First regions 228*a-f* may have substantially the same color as and underlie the flock fibers in the lettered areas 104*a-m*, and the second region 232 may be substantially the same color as and underlie the flock fibers in the background region 108. Alternatively, the first regions 228 *a-f* may have a similar color as and underlie the flock fibers in the lettered areas 104*a-m*, and the second region 232 may be a similar color as and underlie the flock fibers in the background region 108. Further, first regions 228 *a-f* may have a color of a different shade as and underlie the flock fibers in the lettered areas 104*a-m*, and the second region 232 may be a similar color, but a color of a different shade as and underlie the flock fibers in the background region 108. In this latter embodiment, an aesthetically pleasing effect may be obtained by providing a light blue fiber and a navy blue adhesive underlying an end of the fiber, a light green fiber with a dark green adhesive, and the like. By color matching the bright lustered flock fibers and its underlying adhesive, the present invention provides a flocked article having a brilliant appearance and reduces the need for substantial flock densities to mask the underlying adhesive.

The second adhesive layer 220 and third adhesive layer 220 may include any suitable adhesive and preferably include a substantially transparent, translucent, and/or clear adhesive that can exhibit thermoplastic or thermoset behavior. Examples of suitable adhesives include water-based or solvent-based epoxies, phenoformaldehyde, polyvinyl butyral, cyanoacrylates, polyethylenes, isobutylenes, polyamides, polyvinyl acetate, latexes, acrylics, and polyesters.

In one embodiment, the third adhesive layer 224 is a thermoplastic and/or a thermosetting adhesive. The third adhesive may be a thermoplastic adhesive in the form of a powder, liquid, or a pre-formed, solid, and self-supporting sheet. In a particular embodiment, the adhesive is a thermoplastic adhesive powder, such as a powdered hot-melt adhesive. As will be appreciated, a hot-melt adhesive quickly melts upon heating and sets to a firm bond on cooling. Most other types of adhesives set by evaporation of solvent. Particularly preferred hot-melt adhesives include polyethylene, polyvinyl acetate polyamides, and hydrocarbon resins. The third adhesive may melt at low temperatures to bond to a desired substrate (not shown) on one side thereof and the flock, colored adhesive, and second adhesive (if provided) on an opposed side. Thus, in one embodiment, the flocked article may further include a substrate having ends of the flock bonded thereto by any one of the colored, second, and third adhesives.

Figure 4:
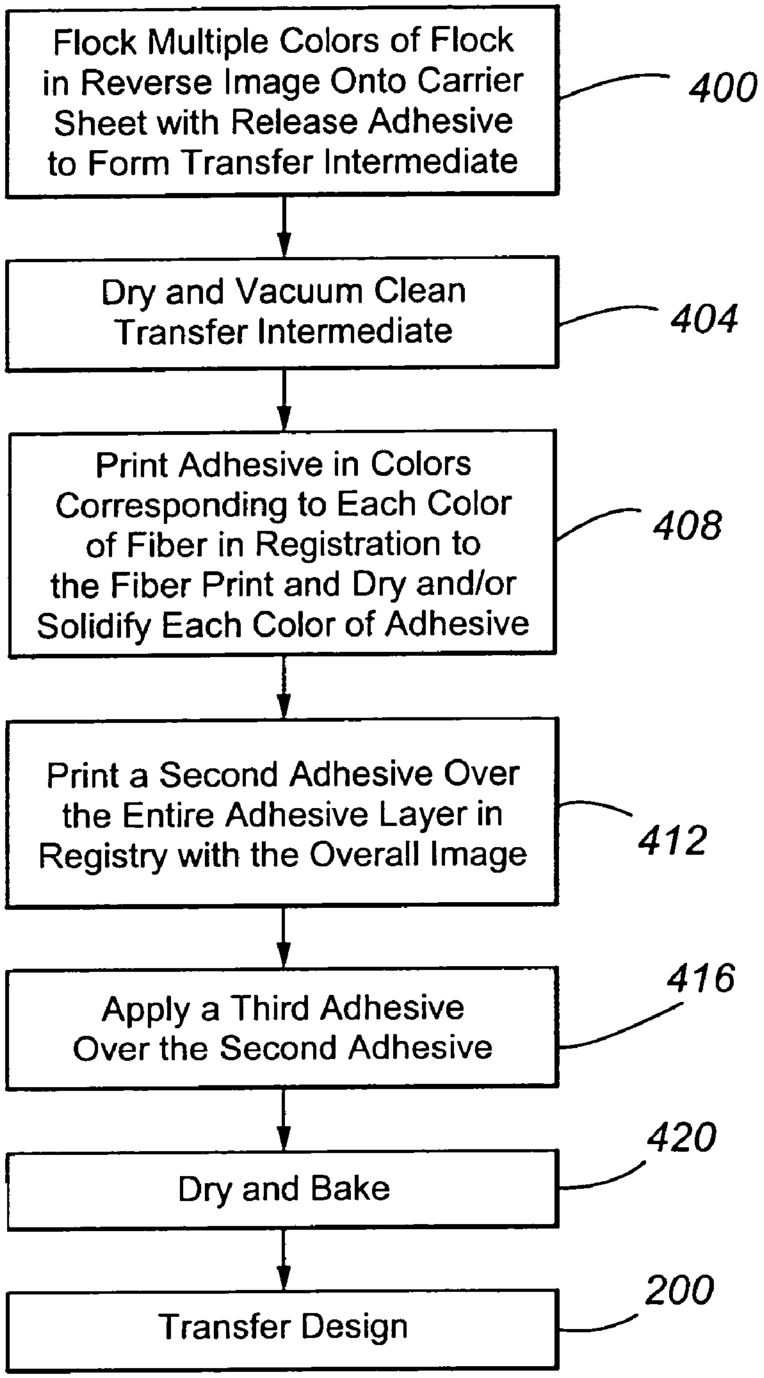
FIG. 4 is a flow chart of a manufacturing process for the flocked transfer of FIG. 2.

A system and process for manufacturing the article 200 will now be discussed with reference to FIGS. 4 and 7.

In step 400, a flocked transfer intermediate is formed by applying the flock fibers to a carrier sheet 204 covered with a release adhesive 208. The flock may be applied to the carrier sheet/release by a number of techniques. For example, the flock may be applied mechanically (including drop, vibration, windblown, or a combination thereof) or electrostatic techniques (including AC or DC electrostatic and air assist techniques). The intermediate is preferably formed by screen printing the release adhesive in a desired pattern (which is typically the reverse of the desired final flock pattern) on the carrier sheet followed by electrostatically flocking the carrier sheet.

In step 404, the intermediate is dried and vacuum cleaned to remove loose flock fibers.

In step 408, the first adhesive is printed onto the ends of the flock 212 in colors corresponding to the colors of the adjacent fibers and in a pattern in registration to the fiber print. The various colored backing adhesives may be printed, simultaneously and in one pass, on a carousel type machine, for example, that when compared to separate printing operations, can be cheaper and easier to register the colors together. The adhesives can be printed, either "wet on wet" (one color after another like a t-shirt printing machine), or in a continuous print/dry/print/dry type cycling that dries each color prior to printing the next one so that the adhesive does not begin to adhere and build up on the screens. When wet adhesive is printed onto wet adhesive, the previously printed wet adhesive will typically stick to the bottom of the subsequent printing screen. To avoid intermixing of the differently colored wet adhesives and building up on the bottom of the printing screen, which may cause the screen to become uneven or moved out of alignment, in one embodiment, the various colored adhesives are dried and/or solidified (such as by forming a film over the previously applied wet adhesive prior to applying the next wet adhesive), in whole or part, between applications.

To adhere the article 200 to a desired substrate, the adhesive layer 224 is placed against the substrate surface (not shown), and heat and pressure applied to the carrier sheet 204. The heat will melt, at least partially, the third adhesive layer 224. When the heat is removed, the third adhesive layer 224 will adhere reversibly (but permanently absent remelting) to the substrate.

Figure 7:
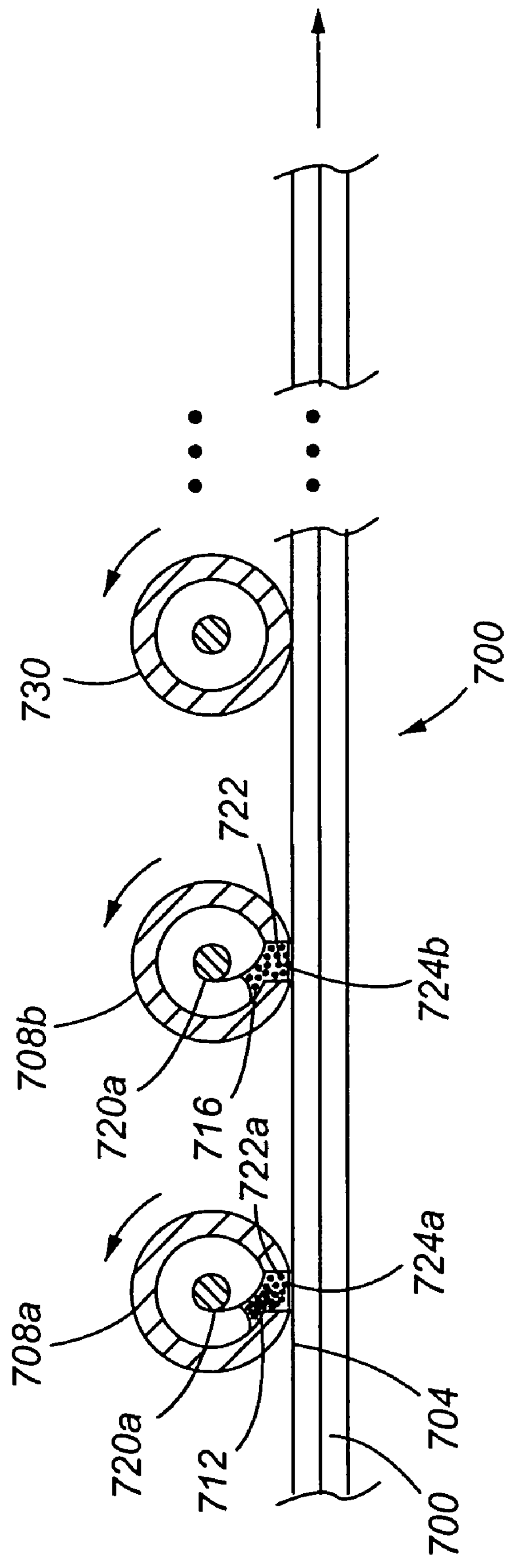
FIG. 7 is a side view of a manufacturing line for the flocked articles according to an embodiment of the present invention.

An apparatus for performing the printing of the adhesives is depicted in FIG. 7. Although FIG. 7 depicts a rotary printing machine, it is to be understood that any type of printing machine may be used. The apparatus includes an endless band 700 tensioned between two deflecting rollers (not shown) that move synchronously. The surface 704 to which the adhesive is applied (which in the embodiment of FIG. 2 is the flock 212 layer) faces upward and the assembly including the surface rests on the band 700. The apparatus includes a plurality of rotatably mounted, identically radiused cylinders or motif generators 708*a-b* positioned above the surface 704 followed by a cylinder 730. The cylinders 708*a-b* and 730 define one cylinder set for depositing a selected color and pattern of (first) adhesive. The cylinders 708*a-b* and 730 move synchronously, and the cylinders 708*a-b* carry motif generators in the form of stencils. The first cylinder 708*a* in each cylinder set has inside of it a corresponding color of flowable liquid adhesive 712 for printing in a desired pattern on the surface 704. The second cylinder 708*b* has inside of it a substance 716 that solidifies the previously applied liquid adhesive and/or forms a skin on the previously applied liquid adhesive. Stated another way, the substance is applied over and in the same pattern as the pattern of the adhesive applied by the immediately preceding cylinder 708. Thus, the first and second cylinders apply, respectively, adhesive and the substance in the same pattern in an overlapping relationship; that is, the patterns are in registration with one another.

A stationary ducter 720 positioned in the central portion of each cylinder supplies the adhesives and substances. During each revolution, the adhesive or substance, as the case may be, exits a corresponding orifice 722 and screen 724. Typically, in a cylinder set, the orifice 722 of the adhesive-depositing cylinder is slightly smaller than the orifice 722 of the substance-depositing cylinder so that the substance is deposited over the entire areal extent of the wet adhesive. In the cylinders, the ducter spreads out the adhesive or substance, as the case may be, over the corresponding orifice, which guides the liquid onto and through the corresponding screen and onto the surface.

In one embodiment, the substance contains a solidifying agent that causes the adhesive to solidify, in whole or part, before the next cylinder applies a next liquid adhesive of a different color. The use of a solidifying agent permits the various colors of adhesives to be applied relatively rapidly, one after the other, generally without significantly increasing the incidence of clogging of the adhesive depositing stations. As will be appreciated, such clogging is typical when printing one wet adhesive in proximity to another wet adhesive.

Any solidifying agent suitable for the selected adhesive chemistry may be employed. In one embodiment, the substance includes a metal salt, and preferably a bivalent and/or trivalent metal salt on a base of a metal from Groups IA (alkali metals), IIA (alkaline earth metals), VIIB, VIIIA, IB, IIB, and IIIB of the Periodic Table of the Elements (Previous IUPAC form), and even more preferably a metal salt of magnesium and/or calcium and/or aluminum.

In another embodiment, the adhesive includes an alginate compound before application (which is a derivative of alginic acid (e.g., calcium, sodium, or potassium salts or propylene glycol alginate)). As will be appreciated, alginates are normally hydrophilic colloids (hydrocolloids) obtained from seaweed. Sodium alginate, in particular, is water-soluble but reacts with calcium salts to form insoluble calcium alginate. As will be appreciated, alginates are normally hydrophilic colloids (hydrocolloids) obtained from seaweed. Sodium alginate, in particular, is water-soluble but reacts with calcium salts to form insoluble calcium alginate.

In yet another embodiment, the substance includes a metal salt and an alginate as described above. When contacted with one another, the metal salt and alginate react to form at least one of a substantially transparent and a translucent film.

In one configuration, an alginate compound may be provided in the flowable liquid adhesive 712. The metal salt may thereafter be applied over the liquid adhesive. The metal salt and alginate compound then react to form a substantially transparent film or skin over the colored adhesive. The skin forms instantaneously on the liquid adhesive before the adhesive contacts the next cylinder 730. This skin is preferably smooth, and at least one of substantially transparent and substantially translucent such that the adhesive is not disturbed. Moreover, the skin is thin and normally does not smear. To avoid clogging of the orifice of the substance-depositing cylinders at the edges, the orifice is made sufficiently large such that the orifice does not contact the front and rear edge of the previously applied adhesive pattern. Otherwise, the reaction between the alginate and the metal salt would likely clog the orifice.

The cylinder 730 is shown merely diagrammatically. It has the same structure as the other cylinders in the cylinder set. However, the orifice of the cylinder 730 may be angular at another location, as there is no intent to print over the previously deposited adhesive. The adhesive is preferably neither pressed (squeezed) into the surface by the cylinder 730, nor does it remain adhering to the circumference of the cylinder 730. To the contrary, the various (first) adhesives may travel through undamaged under the cylinder 730. The (outer) skin has self-sealing properties. Even if the skin were to burst, as a result of the pressure of the cylinder 730, the small hole or crack would instantly close again, and a minimum outgrowth would occur. Enough alginate and metal salt still remains to ensure that the skin formation can occur repeatedly without mishap. As will be appreciated, the cylinder 730 follows each substance-depositing cylinder.

When the colored adhesives include a plastisol, the adhesives may alternatively be flash cured between adhesive applications or after one color adhesive is deposited and before the next color adhesive is deposited. Quick-drying of each adhesive (i.e., latex adhesives), color may be accomplished by "flash" drying units, commonly used by screen printers, or could be accomplished by using "UV adhesives" that cure with the use of UV lamps. The different colored adhesives may have the same functionality or adhesion as the "bond" adhesive used in conventional flock transfers; that is, the functionality is to adhere to flock fibers on one side and a thermoplastic adhesive powder or film, for example, on the other side.

In another apparatus configuration, the metal salts can be applied over the entire width of the surface 704 by means of an applicator (not shown). The surface 704 is thereby impregnated with a layer of the metal salts. The adhesive-applying cylinders deposit their respective adhesive patterns containing the alginate compound into the salt layer. The above reaction between the alginate compound and the metal salt then occurs to form a skin layer over the colored adhesive as discussed previously. In this apparatus configuration, the first cylinder deposits the substance over the areal extent of the first adhesive layer and the following cylinders thereafter apply the desired colors and patterns of (first) adhesives without being followed by a corresponding substance-depositing cylinder. The apparatus configuration of these configurations are discussed in GB 2,227,715 to Hechler, which is incorporated herein by this reference.

In yet another apparatus configuration, dryers are positioned between the first and third cylinders in each cylinder set. In other words, a dryer is positioned in lieu of the substance-depositing cylinder in each cylinder set. Rather than using a solidifying agent, the dryer dries or cures the adhesive before the next differently colored is applied. Generally, this configuration has much slower printing or web speeds compared to the prior two apparatus configurations using solidifying agents.

In step 412, after all of the differently colored adhesives are printed onto the corresponding fiber colors, the (optional) second adhesive 220 is printed over the entire design area (or over all of the first adhesives in the first adhesive layer) and in registry with the overall image. The printing of the second adhesive may be performed by any suitable method known in the art.

In step 416, the third adhesive is applied to the second adhesive and, in step 420, the transfer design 200 is heated to dry and bake (or cure) the various adhesives. One skilled in the art would appreciate the desirable temperatures and residence times of this step.

Figure 3:
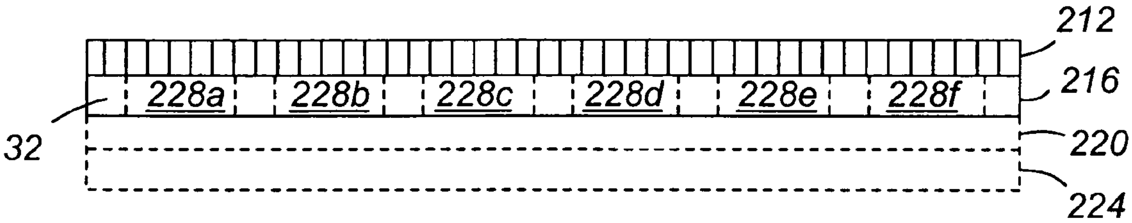
FIG. 3 is a side view of the flocked transfer without the carrier sheet and release adhesive.
Figure 5:
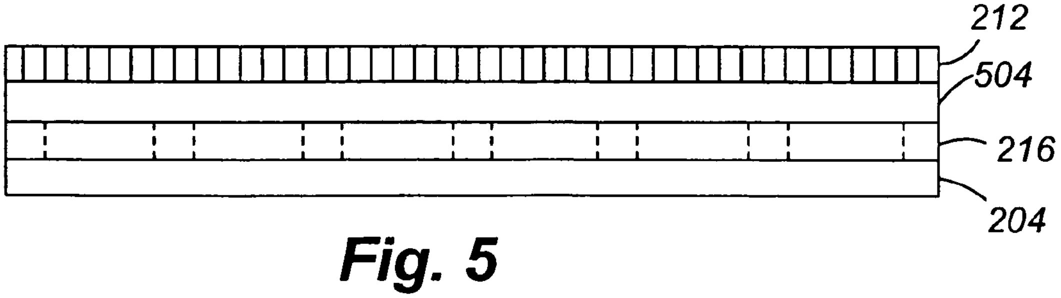
FIG. 5 is a side view of a direct flocked article according to an embodiment of the present invention.

FIG. 5 depicts a design article 500 according to another embodiment of the present invention. The design article 500 differs from the transfer design of FIGS. 2-3 in that a flock adhesive layer 504 is positioned between ends of the flock and the (first) adhesive layer 216 and the carrier sheet 204 is positioned on the other side of the (first) adhesive layer 216. The flock adhesive 504 can be any suitable liquid adhesive for binding flock fibers together, including any of the adhesives referenced above.

Figure 6:
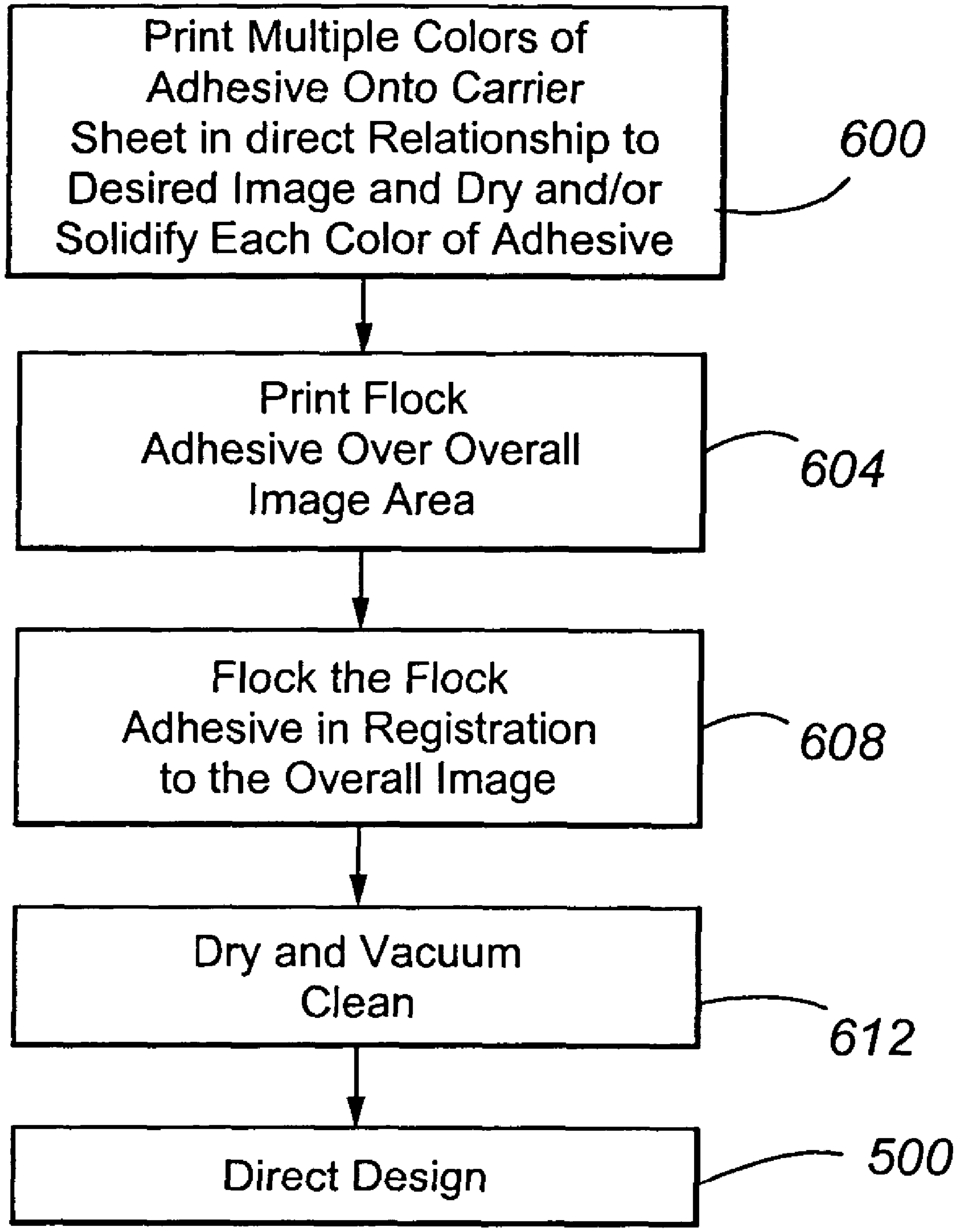
FIG. 6 is a flow chart of a manufacturing process for the direct flocked article of FIG. 5.

The process for manufacturing the article 500 will now be discussed with reference to FIG. 6.

In step 600, multiple colors of adhesive are printed onto the carrier sheet 204 in a direct relationship to the desired image, and each color of adhesive is dried, solidified, and/or fused. This step can be performed using the techniques and the printing apparatus 700 described above.

In one embodiment, the adhesive is in the form of a resin dispersion that may be solidified using heat or high frequency energy as set forth in copending U.S. Pat. No. 6,977,023, the entirety of which is incorporated by reference herein. Examples of suitable adhesives include high temperature adhesives, such as polybenzimidazoles and silica-boric acid mixtures or cermets, hot-melt adhesives, thermoset adhesives, and polyurethane. A particularly preferred adhesive is in the form of a resin dispersion is plastisol. The resin dispersion gels and/or fuses when heated or subjected to high frequency welding.

In step 604, the flock adhesive 504 is printed over the overall image area. Preferably, the flock adhesive 504 is at least one of clear, substantially translucent, and substantially transparent so as not to detrimentally impact the viewability or viewed color of the underlying (first) adhesives.

While the flock adhesive 504 is wet and tacky, in step 608, flock is flocked directly into the corresponding color of preprinted (first) adhesive. Each color of flock is flocked in a pattern in registry with a corresponding and at least similarly colored (first) adhesive. The at least similarly colored adhesive may be identical in color, substantially similar in color, similar in color, or similar in color but of a different shade, relative to the color of the corresponding flock fibers. In the latter embodiment, for example, a light blue fiber may be backed up with a navy blue adhesive, a light green fiber with a dark green adhesive, and so forth. An important aspect of the invention is using multiple colors of fiber with coordinated multiple colors of adhesive and brilliant, shiny, clear flock fibers. This is made possible by controlling the color of the underlying adhesive.

In step 612, the flock adhesive and colored adhesives are dried and/or solidified, if necessary, and the loose flock fibers removed by a vacuum or any other suitable device.

A number of variations and modifications of the invention can be used. It would be possible to provide for some features of the invention without providing others.

For example, in one alternative embodiment, the multicolored first adhesives of first adhesive layer 216 are deposited on a carrier sheet and coated with a transparent adhesive in a first production line, a carrier sheet containing release adhesive is flocked in a second production line, and the free ends of the flock contacted with the transparent adhesive in a third production line to form a transfer having upper (top) and lower (bottom) carrier sheets. When the flock is contacted with the transparent adhesive, the flock image is in registry to the corresponding adhesive image. The transparent adhesive can then be heated and cured to permanently adhere the flock to the adhesive.

In another embodiment, decorative media other than flock can be used in the article in place of the flock layer 312. For example, glitter, glass beads, metal foil, and other decorative materials may be employed.

In yet another embodiment, the decorative articles of the present invention are manufactured using multicolor direct flocking, as opposed to heat transfer, prints, patches, and the like.

In still another embodiment, multicolor flocking is performed directly onto a release adhesive-coated carrier sheet. A thermoset adhesive, which may be in the form of a preformed, solid, continuous, and self-supporting sheet, is applied to free ends of the flock to provide strong functional flock adhesion thereto. Preferably, the depths to which the fibers penetrate into the adhesive are carefully controlled and are substantially uniform. Thereafter, each matching color (ink or adhesive) is printed onto the thermosetting adhesive. The application of the various colors is then followed by lamination of a solid, self-supporting, and thermosetting sheet over the matching colors (adhesives or inks).

In still another embodiment, multicolor flocking is performed directly onto a release adhesive-coated carrier sheet. One overall transparent, translucent, and/or clear adhesive, such as a latex adhesive, is printed onto the free ends of the flock to cover the entire flock, hold it together, and provide functional flock adhesion. Preferably, the depths to which the fibers penetrate into the adhesive are carefully controlled and are substantially uniform. This is considered to be best done by printing the adhesive in one pass. A one pass process is considered to be more practical than trying to print and control the depths to which up to six different colors of adhesives are penetrated by the flock fibers. The latex adhesive provides a flat, controlled surface for the printing of subsequent colors. Then, each matching color is printed onto the first clear layer. Application of the various colors are then followed by the application, to the colored layer, of either a final clear or white latex print followed by the application of a thermoplastic and/or thermosetting powder to the final latex print or by application of a pre-formed, solid adhesive film to the final latex print. The various colors may be in the form of colored adhesives, such as colored latex adhesives.

In one variation, the colored layer in which the desired multi-colored print is provided beneath the multi-colored flock is not formed from adhesive materials. Rather, the layer may be formed using colored materials other than colored adhesives, such as sublimation inks and water-based, acrylic emulsion, pigmented inks. The inks may be applied by any suitable printing technique, such as ink jet printing and screen-printing. In one variation, the colors are printed on the reverse of the transparent, translucent, and/or clear adhesive layer using the multi-pigment printing system of UK Patent 2,227,715. As noted above, in this system wet-on-wet ink printing is effected using the reaction between a bivalent metal salt and/or trivalent metal salt on a base of magnesium and/or calcium and/or aluminum and an alginate to form a protective film or skin on the previously applied ink before the next ink is applied.

In yet another embodiment, the alginate is printed onto the surface 704 while the metal salt is included in the adhesive. The layer of alginate previously coated onto the surface 704 will react with the metal salt in the adhesive when the adhesive is deposited to form the protective film or skin.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A flocked article, comprising:

a first adhesive layer comprising a plurality of differently colored adhesives, wherein each of the differently colored adhesives are laterally positioned adjacent to one another to form a colored adhesive pattern; and a plurality of differently colored flock fibers, wherein the differently colored flock fibers form a flock layer having a colored flocked pattern; and a second adhesive layer positioned between the first adhesive layer and the flock fibers, wherein the flock fibers are adhered to the second adhesive layer, wherein the colored flocked and the colored adhesive patterns are substantially in registration with one another and wherein the second adhesive layer is at least one of substantially transparent, translucent, and clear.

2. The article of claim 1, wherein the plurality of flock fibers have a bright luster and further comprising:

a third adhesive layer in contact with the first adhesive layer, wherein the first adhesive layer is positioned on a side of the first adhesive layer opposing the second adhesive layer.

3. The article of claim 1, wherein the first adhesive layer comprises an aliginate compound and a solidifying agent and wherein the solidifying agent comprises a bivalent and/or trivalent metal salt on a base of a metal from Groups IA (alkali metals), IIA (alkaline earth metals), VIIB, VIIIA, IB, IIB, and IIIB of the Periodic Table of the Elements (Previous IUPAC form).

4. A multi-colored flocked article comprising:

(a) a plurality of flock regions, each flock region comprising flock fibers of substantially the same color, wherein each flock region has differently colored flock fibers relative to an adjacent flock region, and wherein at least most of the flock fibers in the plurality of flock regions are substantially free of light dispersants; and (b) a first adhesive layer being at least one of substantially transparent and translucent, wherein a first surface of the first adhesive layer engages the flock fibers;

(c) a plurality of colored backing regions located on a second surface of the first adhesive layer, the first and second surfaces being located on opposing sides of the first adhesive layer and each backing region corresponding to a flock region and having a colored ink, the color of the ink being at least similar to a color of the flock fibers in the corresponding flock region; and (d) a second adhesive layer engaging the plurality of colored backing regions, the backing regions being located between the first and second adhesive layers.

5. The article of claim 4, wherein the at most of the flock fibers comprise less than about 1% by weight light dispersants.

6. The article of claim 4, wherein the backing regions comprise a solidifying agent.

7. The article of claim 6, wherein the solidifying agent is selected from the group consisting of a metal salt, an alginate compound, and a reaction product of the metal salt and alginate compound.

8. An article manufactured by a method, the method comprising the steps:

(a) operatively engaging a first colored backing material having a first color at least similar to a first set of flock fibers with a first set of flock fiber ends; and (b) operatively engaging a second colored backing having a second color at least similar to a second set of flock fibers with a second set of flock fiber ends, wherein the first and second sets of flock fibers are positioned adjacent to one another, wherein the first and second set sets of flock fibers are substantially perpendicular to the first and second colored backing materials, wherein the first and second sets of flock fibers are at least substantially free of light dispersants, wherein a skin layer is formed on the first and second colored backing layers prior to operatively engaging the first and second colored backing layers, respectively, with the first and second set of flock fiber ends, and wherein the skin layer comprises at least some of the first and second backing layers impregnated with a solidifying agent, wherein the first colored backing material is in registration with the first set of flock fibers, wherein the second colored backing material is in registration with the second set of flock fibers, wherein an adhesive layer, that is at least one of substantially transparent and translucent, is positioned between the first and second sets of flock fibers and the first and second backing materials, and wherein the first and second backing materials do not contact ends of the flock fibers in the first and second flock fiber sets, respectively.

9. The article of claim 8, wherein the first colored backing material is in registration with the first set of flock fibers, wherein the second colored backing material is in registration with the second set of flock fibers, and wherein the first and second backing materials are adhesives.

10. The article of claim 8, wherein the first and second backing materials are inks.

11. The article of claim 8, wherein the first and second sets of flock fibers comprise no more than about 1 wt % light dispersants, and wherein steps (a) and (b) comprise the substeps of:

forming a flocked carrier sheet, the flocked carrier sheet comprising the first and second sets of flock fibers;

contacting the first colored backing material with the flocked carrier sheet; and contacting the second colored backing material with the flocked carrier sheet.

12. The article of claim 8, wherein the first and second sets of flock fibers comprise no more than about 1 wt % light dispersants and wherein, in steps (a) and (b), the first and second sets of flock fibers are direct flocked onto a substrate comprising the first and second colored backing materials.

13. The article of claim 8, at least some of the skin layer comprises a solidifying agent selected from the group consisting of a metal salt, an alginate, and a reaction product of the metal salt and alginate.

14. The article of claim 13, wherein the first backing material is applied before the second backing material, and wherein the second backing material is applied in liquid form while the first backing material is wet.

15. The article of claim 8, wherein the first backing material is applied, in liquid form, before the second backing material, and wherein the second backing material is applied in liquid form after at least one of a substantially transparent or translucent film has been formed over the first backing material.

16. The article of claim 8, wherein the first backing material is applied, in liquid form, before the second backing material, and wherein the second backing material is applied in liquid form after the first backing material has been dried.

17. The article of claim 8, wherein the skin layer is positioned between the first and second sets of flock fibers and the first and second colored backing materials.

18. An article manufactured by a method, the method comprising the steps:

(a) operatively engaging a first colored backing material having a first color with a first set of flock fibers having at least a similar color to the first color; and (b) operatively engaging a second colored backing material having a second color with a second set of flock fibers having at least a similar color to the second color, wherein the first and second sets of flock fibers are positioned adjacent to one another, wherein the first and second sets of flock fibers are at least substantially free of light dispersants, wherein the first colored backing material is in registration with the first set of flock fibers, wherein the second colored backing material is in registration with the second set of flock fibers, wherein an adhesive layer, that is at least one of substantially transparent and translucent, is positioned between the first and second sets of flock fibers and the first and second backing materials, and wherein the first and second backing materials do not contact ends of the flock fibers in the first and second flock fiber sets, respectively.

19. The article of claim 18, wherein the first and second backing materials are inks.

20. The article of claim 18, wherein the first backing material is applied, in liquid form, before the second backing material, and wherein the second backing material is applied in liquid form after at least one of a substantially transparent or translucent film has been formed over the first backing material.

21. An article manufactured by a method, comprising the steps of:

providing a flocked surface having at least first and second sets of flock fibers, the first set of flock fibers having first ends, the second set of fibers having second ends;

applying a first adhesive to the first ends, wherein the first adhesive comprises an alginate compound and has a first adhesive color;

thereafter, contacting a solidifying agent with the first adhesive;

reacting the alginate compound with the solidifying agent to form a film on at least a portion of the applied first adhesive; and applying a second adhesive to the second ends, wherein the second adhesive has a second adhesive color, the second adhesive color differs from the first adhesive color, wherein the second adhesive is laterally positioned adjacent to the first adhesive, and wherein at least some of the first adhesive is in contact with at least some of the second adhesive wherein the first and second adhesives comprise a first adhesive layer, wherein a second adhesive layer is in contact with the first adhesive layer, wherein the first adhesive layer is positioned between the second adhesive layer and the first and second sets of flock fibers, and wherein the second adhesive is at least one of substantially transparent, translucent, and clear.

22. The article of claim 21, wherein the at least some of one or both of the first and second sets of flock fibers have, at most, only a small amount of white pigment and a low light scattering ability, wherein the solidifying agent comprises a bivalent and/or trivalent metal salt on a base of a metal selected essentially from Groups IA (alkali metals), IIA (alkaline earth metals), VIIB, VIIIA, IB, IIB, and IIIB of the Periodic Table of the Elements (Previous IUPAC form), the combinations thereof.

23. The article of claim 21, wherein a third adhesive layer is in contact with the second adhesive layer, the second adhesive layer being positioned between the first and the third adhesive layers, and wherein the third adhesive layer is a thermoplastic adhesive.

24. The article of claim 23, wherein a fourth adhesive layer is positioned between the first adhesive layer and the flock fibers, the fourth adhesive layer being substantially transparent.

25. The article of claim 21, wherein the solidifying agent is contacted with the first adhesive after the applying of the first adhesive step and before the applying of the second adhesive step.

26. The article of claim 21, wherein the solidifying agent is contacted with the flocked surface before one or both of the applying first and second adhesive steps.

27. The article of claim 21, wherein the first adhesive is applied by a first cylinder and the solidifying agent by a second cylinder and wherein the solidifying agent is applied over the first adhesive.

28. The article of claim 21, wherein the solidifying agent is applied to the flocked surface before the first adhesive and wherein the first adhesive and solidifying agent substantially overlap.

* * * * *